UNITED STATES PATENT OFFICE.

SAMUEL SIMMONS, OF WILTON, MAINE.

IMPROVEMENT IN ABRASIVE COMPOSITIONS.

Specification forming part of Letters Patent No. 196,488, dated October 23, 1877; application filed August 21, 1877.

*To all whom it may concern:*

Be it known that I, SAMUEL SIMMONS, of Wilton, of the county of Franklin, of the State of Maine, have invented a new and useful Abrasive Composition; and do hereby declare the same to be described as follows:

The said composition is for use on rifles for sharpening scythes, and also on grinding wheels or surfaces, or on paper or cloth. It is composed of a segregated or powdered abrasive substance, such as emery or corundum, and also of carbonate of lead, calcined gypsum, whiting, and an adhesive or drying water-proof vehicle.

In making the said composition, to one hundred pounds of the emery or corundum, in a powdered or comminuted state, add twenty-five pounds of carbonate of lead, twenty-five pounds of the calcined gypsum, and twenty-five pounds of the whiting. The whole should be thoroughly mixed together, and with the drying and water-proof vehicle, which I usually compose of boiled linseed-oil, japan, and copal or other varnish, in equal or about equal proportions, using a sufficient amount of the vehicle to convert the composition into a thick paste.

To fix such composition or paste on a scythe rifle-bar, or on a wheel or other article, I generally employ glue or some suitable cement. The whiting serves to give body to the composition and prevent glazing of the emery or the carbonate of lead. The calcined gypsum, while giving body to the composition, operates to prevent it from cracking in drying. I have found that when both whiting and calcined gypsum are used in making the composition it is very much better than when either is used without the other, as the particles or masses of the emery or corundum are held stronger in union or place, and the rifle generally works to better advantage or effect, and is more durable.

I do not confine my said composition to the above-mentioned proportions of its ingredients, as they may be considerably varied without materially changing its character or efficiency.

I claim as my invention—

The abrasive composition, substantially as described, for use as set forth, it consisting of emery, carbonate of lead, whiting, calcined gypsum, and a uniting vehicle, essentially as explained.

SAMUEL SIMMONS.

Witnesses:
 R. H. EDDY,
 JOHN R. SNOW.